US008366087B2

(12) United States Patent
McAdoo et al.

(10) Patent No.: US 8,366,087 B2
(45) Date of Patent: Feb. 5, 2013

(54) TRUSS ASSEMBLY TABLE WITH AUTOMATIC JIGGING

(75) Inventors: David L. McAdoo, Alvarado, TX (US); Ronald E. Findley, Bedford, TX (US); Jeffrey Ceurter, Fort Worth, TX (US); Neil Bradley, Grand Prairie, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 1162 days.

(21) Appl. No.: 12/022,103

(22) Filed: Jan. 29, 2008

(65) Prior Publication Data

US 2008/0179802 A1 Jul. 31, 2008

Related U.S. Application Data

(60) Provisional application No. 60/887,096, filed on Jan. 29, 2007.

(51) Int. Cl.

| | |
|---|---|
| ***B25B 1/20*** | (2006.01) |
| ***B25B 27/14*** | (2006.01) |
| ***B23Q 3/00*** | (2006.01) |
| ***B25C 7/00*** | (2006.01) |
| *B25B 11/02* | (2006.01) |

(52) U.S. Cl. ............ 269/37; 269/43; 269/303; 269/304; 29/281.3; 227/154

(58) Field of Classification Search .................... 269/74, 269/43, 304, 40, 303, 99, 225, 910; 29/281.3; 227/154
See application file for complete search history.

(56) References Cited

U.S. PATENT DOCUMENTS

| | | | | |
|---|---|---|---|---|
| 2,212,421 | A | 8/1940 | Henderson | |
| 2,810,414 | A | 10/1957 | Wilson | |
| 2,919,733 | A | 1/1960 | Johnson | 269/910 |
| 3,068,484 | A | 12/1962 | Moehlenpah et al. | |
| 3,241,585 | A | 3/1966 | Jureit | |
| 3,319,323 | A | 5/1967 | Groat | |
| 3,371,921 | A | 3/1968 | Hollomon et al. | 269/910 |
| 3,552,254 | A | 1/1971 | Marczy | 83/461 |
| 3,693,542 | A | 9/1972 | Moehlenpah | 269/910 |
| 3,734,376 | A | 5/1973 | Abernathy | |
| 3,811,167 | A | 5/1974 | Schneider | |

(Continued)

FOREIGN PATENT DOCUMENTS

FR 2693148 A1 1/1994

OTHER PUBLICATIONS

Timber Trader; Gang-Nails' Auto-Jig Sets World Standards News; Autobuild News; p. 44; Dandenong, Victoria, Australia; Apr. 1999.

(Continued)

*Primary Examiner* — Lee D Wilson
*Assistant Examiner* — Alvin Grant
(74) *Attorney, Agent, or Firm* — Booth, Albanesi, Schroeder, LLC

(57) ABSTRACT

A jig positioning system for use on a truss assembly table. The puck assembly 108 has a puck 109 positioned at least partially above the table top 105 with the puck 109 connected to a carriage 110 positioned at least partially below the table top. The puck assembly 108 moves along slots 118 in the table top 105. A threaded rod 102 extends through a threaded passageway 103 in the carriage 110, so, when the threaded rod rotates, the puck assembly moves along a corresponding slot in the table. A rod support member 116 extends along the length of the threaded rod 102 and is positioned below the threaded rod 102, the support member 116 contacting the carriage and, thereby, preventing the threaded rod from excessive sagging. A debris path is provided along both sides of the support member 116.

19 Claims, 5 Drawing Sheets

U.S. PATENT DOCUMENTS

| | | | | |
|---|---|---|---|---|
| 3,896,717 | A | 7/1975 | Schmitt | |
| 4,084,498 | A | 4/1978 | Weaver | 269/910 |
| 4,154,436 | A | 5/1979 | Sellers | 269/910 |
| 4,567,821 | A | 2/1986 | McDonald | |
| 4,669,184 | A | 6/1987 | Castillo | |
| 4,821,408 | A | 4/1989 | Speller, Sr. et al. | 29/701 |
| 4,943,038 | A | 7/1990 | Harnden | |
| 5,085,414 | A | 2/1992 | Weaver | 269/37 |
| 5,092,028 | A | 3/1992 | Harnden | |
| 5,342,030 | A | 8/1994 | Taylor | |
| 5,608,970 | A | 3/1997 | Owen | |
| 5,702,095 | A | 12/1997 | Williams | |
| 5,837,014 | A * | 11/1998 | Williams | 29/401.1 |
| 5,854,747 | A | 12/1998 | Fairlie | |
| 5,947,460 | A | 9/1999 | Williams | 269/37 |
| 6,042,096 | A | 3/2000 | MacLean | |
| 6,317,980 | B2 | 11/2001 | Buck, III | |
| 6,702,269 | B1 * | 3/2004 | Tadich | 269/37 |
| 6,712,347 | B1 | 3/2004 | Fredrickson et al. | |
| 6,899,324 | B2 | 5/2005 | Fredrickson et al. | |
| 7,093,829 | B2 | 8/2006 | Fredrickson et al. | |

OTHER PUBLICATIONS

Timber Trader; Ace 'Ecstatic' Over Auto-Jig; Autobuild News; p. 43; Dandenong, Victoria, Australia; May 1999.
Timber Trader; The Fabricators First Choice; Autobuild News; Dandenong, Victoria, Australia; Jul. 1999.
Timber Trader; The Big End; Autobuild News; p. 50-52; Dandenong, Victoria, Australia; Oct. 1999.
Timber Trader; Home of the Gang-Nail Building Systems; Autobuild News; Dandenong, Victoria, Australia; Feb. 2000.
Timber Trader; Positives of the Big End; Autobuild News; p. 42-43; Dandenong, Victoria, Australia; Jun. 2000.
Timber Trader; Mitek Hold Expo; Autobuild News; p. 45; Dandenong, Victoria, Australia; Jun. 2000.
Mitek Auto-Jig Manual, Mar. 2000.
Machine Design—Jared George; Comparing the Attributes of Linear Drives; p. 122, 124; www.Machinedesign.com; Cleveland, Ohio, USA; Feb. 11, 1999.
Thomas Publishing Company; Abacuses—Thru-Bags: Netting; Thomas Register of American Manufacturers; pp. 1-7; WWW.THOMASREGISTER.COM; New York, New York, USA; 2000.
The Koskovich Company; Omni Jet-Set Automated Truss Jigging System; pp. 1-4; Rochester, Minneapolis, USA; (Admitted Prior Art) date unknown.
Alpine Engineered Products, Inc.; Autoset C; pp. 1-2; Pompano Beach, Florida, USA; Apr. 2001.
Alpine Engineered Products, Inc.; Trusset Jigging System; pp. 1-6; WWW.ALPINEEQUIP.COM; Pompano Beach, Florida, USA; Sep. 2002.
Gang-Nail Systems, Inc.; Gang-Nail Easy Set Hardware; The Gang-Nail Easy Set System Manual; 19 pages; USA; (Admitted Prior Art) date unknown.
Mitek Industries, Inc.; Mitek Easy-Set Jigging System; Brochure, 1993.
Wizard PDS Training (Admitted Prior Art) date unknown.
Wizard PDS 7 Minute Video (Admitted Prior Art) date unknown.
Autoset C4—Floormaster—Ram Eady Rider; MPEG 1 Video; Aug. 24, 2006.
Ram Line Truss FAB System M65BS; MPEG 1 Video; Jan. 1997.

* cited by examiner

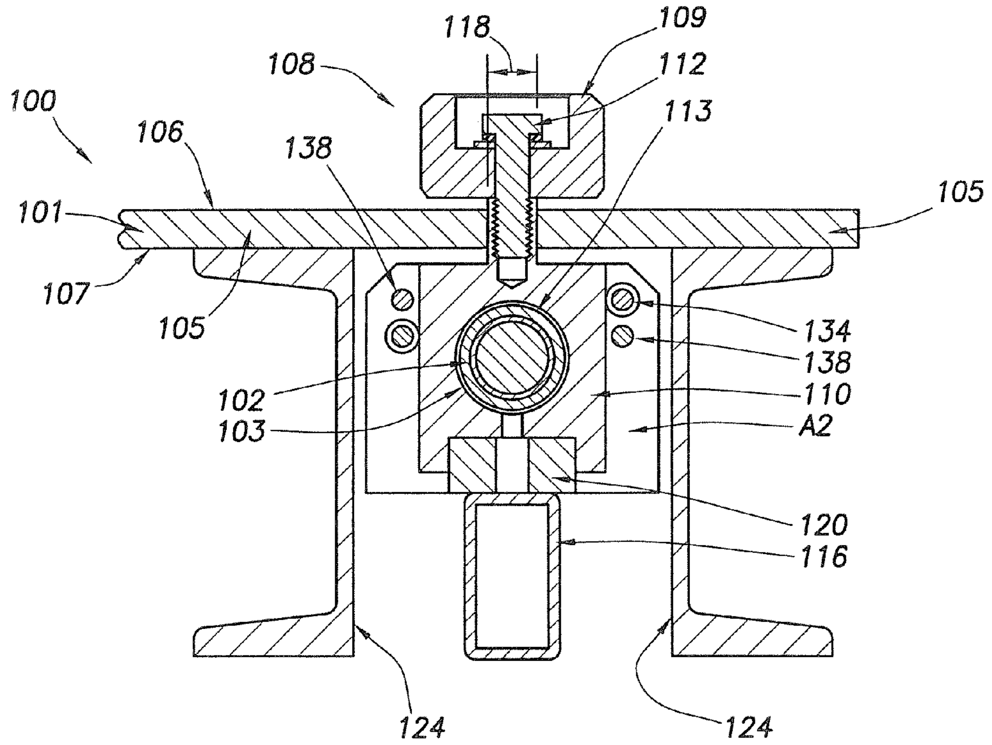
FIG.3
FIG.6
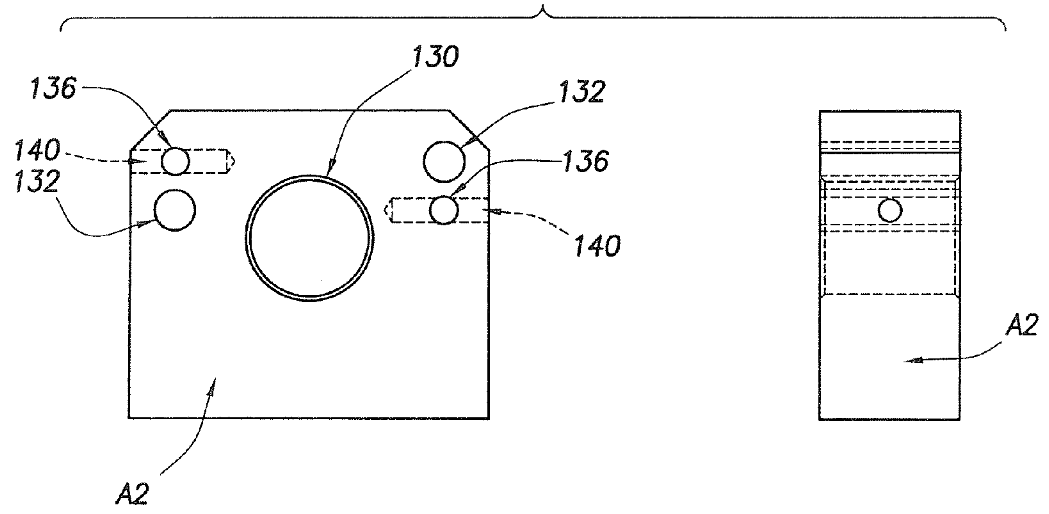

TRUSS ASSEMBLY TABLE WITH AUTOMATIC JIGGING

CROSS REFERENCE TO RELATED APPLICATION

This application claims priority of provisional Ser. No. 60/887,096, filed Jan. 29, 2007

STATEMENT REGARDING FEDERALLY SPONSORED RESEARCH OR DEVELOPMENT

Not applicable

REFERENCE TO MICROFICHE APPENDIX

Not applicable

TECHNICAL FIELD

The present invention relates to automatic jig setting systems for positioning jig pucks on a truss assembly table. More particularly, the invention relates to such a system having a threaded rod for positioning the jig pucks and providing adequate support for the threaded rod.

BACKGROUND OF THE INVENTION

Jig systems have been used to hold building elements, such as wood boards, in proper position while the building elements are attached to each other to construct a roof support truss. Known jig systems typically employ a horizontal surface (such as a table) for resting the building elements thereon and a plurality of adjustable stops for indicating the proper positions of the building elements in the desired truss design and for holding the building elements in those positions until the elements can be secured together in a permanent manner. For each different truss design, the stops must be repositioned on the jig surface to reflect the different positions of the building elements. Computer programs have been developed to calculate, for various truss designs, the positions of the stops from a reference line, such as an edge of the table. Conventional practice has been to measure the positions of the stops from the reference line, manually move the stops to the positions, manually secure the stops in the desired positions, place the building elements on the table against the stops, fasten the building elements together, remove the completed truss, and then repeat the process by releasing and then re-securing the stops for each different truss design.

As there can be significant variation between the size and shape of roof support trusses used for the same building, a significant amount of the truss production time has been dedicated to resetting the positions of the stops, especially when only one or two trusses for each truss design are needed.

One approach has been to employ a system that automatically moves the jig stops, sometimes referred to as pucks, along slots in the horizontal surface of the truss assembly table. While in concept these systems can save time otherwise needed to measure, move and secure the stops on the table, there have been problems that have cropped up with these systems that make them less time saving and reliable as they could be for optimum efficiency.

Automatic jigging assemblies for use on truss assembly tables are described in U.S. Pat. Nos. 7,093,829; 6,712,347 and 6,889,324 to Fredrickson, et al. and U.S. Pat. Nos. 5,092,028 and 4,943,038 to Harnden. Each of these patents is hereby incorporated by references for any and all purposes.

The environment in which the jig systems are used is filled with debris and dust. Even when the building elements are cut and shaped at a location remote from the jig system, the building elements often carry sawdust and wood chips onto the surface of the table of the jig system. This debris falls or is pushed into the slot in which the puck moves. As each puck is typically mounted on a screw-threaded rod that is positioned below the puck in the slot, the debris often falls onto the rod. Since the rod rotates to move the puck, a rod caked with debris can hamper and even prevent movement of the puck along the rod. Thus, regular and frequent cleaning of the rod is needed to minimize the possibility of breakdowns of the system.

Further complicating this situation is the fact that the screw-threaded rods typically are covered with some type of lubricant to facilitate movement of the puck along the rod, and this often sticky lubricant holds the debris on the surface of the rod. The encrusted rod can carry the debris into the cooperating parts of the system, and cause additional friction and failure.

Still further exacerbating this problem in the known systems is the placement of the rod in a channel located below the slot with a closed bottom that holds the debris in close proximity to the rod, so that infrequent clearing of the channels can bring debris in contact with the rods from the bottom, as well as from the top as debris falls from the table surface.

Desired is a mechanism that will set up to build trusses automatically from computer instruction. The improved mechanism needs to set up quickly, run smoothly to reduce wear and tear on assembly components, and provide a means to prevent the maintenance problems that come from the accumulation of dirt and debris produced by the truss assembly operation in the mechanism. Finally, the system needs to be durable enough to withstand potential damage from the activities of truss assembly.

For truss jigging, the threaded rods that typically drive the pucks must be about 12 to 14 feet (3.65 to 4.27 meters) long. At this length, the threaded rod will sag under its own weight and, when turned at high revolutions per minute, will whip and gyrate violently unless it is properly constrained. Proper constraint is desired to achieve smooth operation of the rod.

The improved mechanism of the current invention will set up very quickly under control of a motion control computer which receives its set up data directly from truss engineering analysis software. The mechanics of the system run very smoothly and thereby greatly reduce the wear on all components, both electrical and mechanical. None of the components of the system will allow the accumulation of dirt and debris. Finally, extraordinarily severe abuse of the system will not cause failure. Details of how this is accomplished are given below.

Also desirable is a durable assembly that will resist extreme abuse from the truss assembly activity that occurs on the surface of the table. This abuse comes primarily from lumber that is being tossed onto the surface of the table and moved into position for truss assembly. Workers will also kick the pucks or hit them with hammers on occasion.

Thus, while the known systems for automatically positioning the pucks on the jig assembly table are an improvement over jig systems requiring manual positioning of the stops, there are significant problems that have arisen with the use of automatic systems.

SUMMARY OF THE INVENTION

A automatic jigging assembly for use on a truss assembly table is presented. A threaded rod turns under the influence of a motor which is controlled by a motion control system. The threaded rod causes a puck to move along a slot in the truss table to a position which will define the perimeter of a truss. The puck is attached to the carriage which is positioned under the table top. A threaded insert may be used between the carriage and the threaded rod. For maintenance purposes, this insert should be made from a material that provides permanent self lubrication and long wear without the addition of dry or wet lubricants that can attract and trap dirt, dust, and debris.

The carriage is supported by a support member, such as a steel tubular, which runs the full length of the slot and is positioned under the threaded rod. A glide pad may be placed between the carriage and the support member. The pad provides a low friction, self lubricating, highly wear-resistant support surface for the carriage.

Support blocks are provided to further support the threaded rod. Pairs of support blocks are maintained at a set distance by connecting rods. Each of the support blocks has a passageway through which the threaded rod extends. As the carriage is moved along the slot by the rotation of the threaded rod, the carriage abuts one of the blocks thereby moving the support blocks along the threaded rod. The threaded rod is supported from excessive sagging by the support member which supports the support blocks and carriage. More than one pair of support blocks may be used.

A jig positioning system is presented for use on a truss assembly table. The puck assembly 108 has a puck 109 positioned at least partially above the table top 105 with the puck 109 connected to a carriage 110 positioned at least partially below the table top. The puck assembly 108 moves along slots 118 in the table top 105. A threaded rod 102 extends through a threaded passageway 103 in the carriage 110, so, when the threaded rod rotates, the puck assembly moves along a corresponding slot in the table. A rod support member 116 extends along the length of the threaded rod 102 and is positioned below the threaded rod 102, the support member 116 contacting the carriage and, thereby, preventing the threaded rod from excessive sagging. A debris path is provided along both sides of the support member 116.

BRIEF DESCRIPTION OF THE DRAWING

The accompanying drawings are incorporated into and form a part of the specification to provide illustrative examples of the present invention and to explain the principles of the invention. The drawings are only for purposes of illustrating preferred and alternate embodiments of how the invention can be made and used. The drawings are not to be construed as limiting the invention to only the illustrated and described examples. Various advantages and features of the present invention will be apparent from a consideration of the accompanying drawings in which:

FIG. 3 is a side, cross-sectional view of a truss table and jigging assembly according to one embodiment of the invention;

FIG. 6 is a side and front view of a support block in accordance with one embodiment of the invention;

DETAILED DESCRIPTION OF PREFERRED EMBODIMENTS

Figure 1:
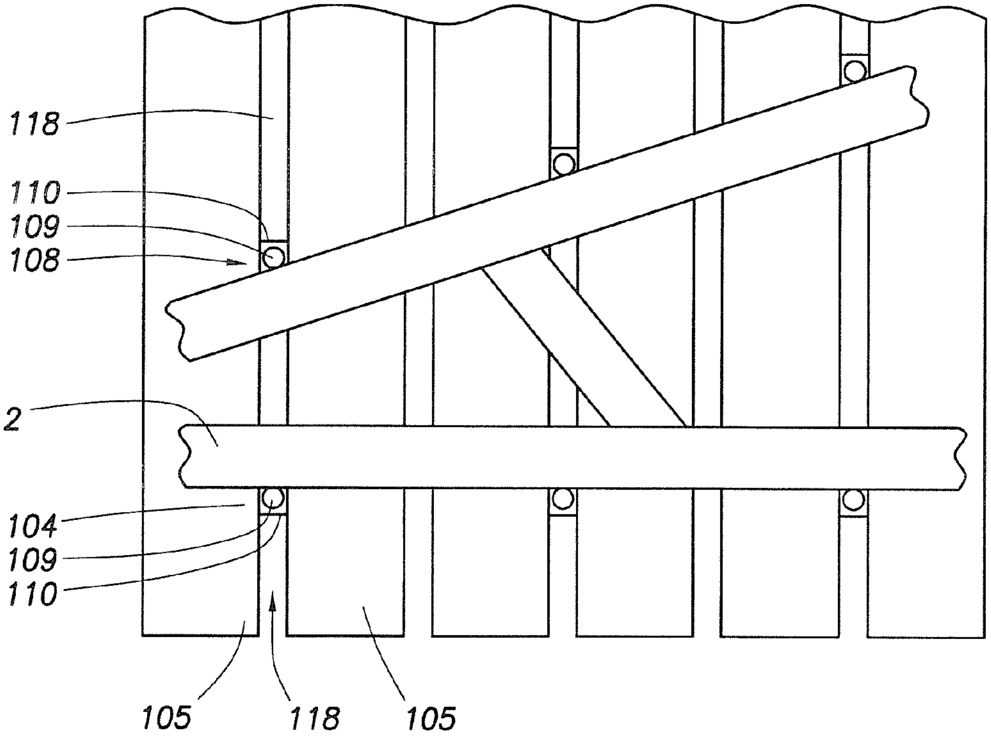
FIG. 1 (PRIOR ART)
FIG. 1 is a top view of a PRIOR ART truss jig positioning system.

FIG. 1 illustrates the prior art truss jig positioning system 100 employed on a table 101 that has and defines a support plane 104 on which work pieces or building elements, such as wood boards 2 or other building materials, are supported in proper position for forming a structure such as a support truss for a roof of a building. The table 101 may comprise a plurality of segments 105 that have upper surfaces 106 that substantially lie in and define the support plane or work surface 104 of the table 101. The upper surface of each of the table segments 105 may be substantially planar, and a plane of the segments may be oriented substantially horizontally. The table segments 105 also have lower surfaces 107.

The segments 105 of the table are separated by openings or jigging slots 118 which extend laterally across the table 101 and preferably extend substantially parallel to each other. Each of the slots 118 may extend substantially perpendicularly to the length of the table and may extend across, or substantially across, the width of the table. In such a configuration, the slots 118 may be oriented substantially parallel to the rise, or height, of a truss when the truss is rested on the support plane of the table.

The system 100 of the invention includes a pin or puck assembly 108 that is movable along one of the slots 118 in the table 101. The jig positioning system 100 may employ a pair of pin assemblies 108 which are independently movable in a single slot 118. Alternately, the slots 118 of the table 101 may each have one puck assembly associated therewith. Each of the slots 118 of the table may have puck assemblies 108, or the puck assemblies may be associated only with every other slot, or every third or fourth slot of the table, for example.

The puck assembly 108 of the invention may include a puck housing or carriage 110 that is moveable along the slot 118. The puck assembly 108 may also include a puck 109 that is mounted on the carriage 110 by a connector, such as a bolt, 112 which extends through the slot 118 to a level located above the support plane 104.

Figure 2:
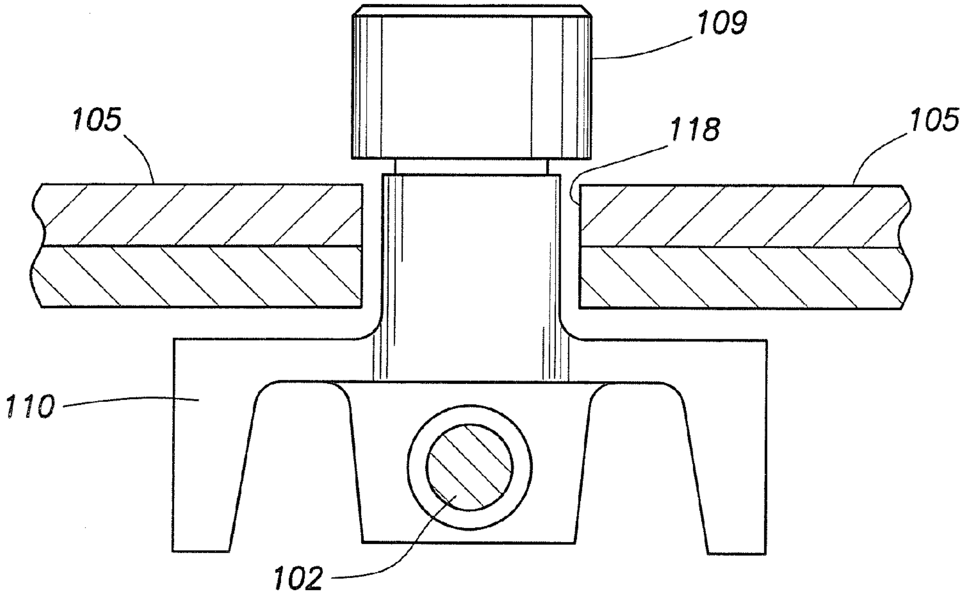
FIG. 2 (PRIOR ART)
FIG. 2 is a side view of a PRIOR ART jig assembly.

FIG. 2 is a prior art design for a puck assembly 108. The puck assembly 108 has a puck 109 located above the work surface 104 of the table 101. The puck 109 is connected to a puck carriage 110 located substantially below the work surface. Threaded rod 102 passes through a threaded passageway 103 in the puck carriage 110 such that rotation of the threaded rod 102 results in movement of the carriage and corresponding puck along the length of the rod. In this embodiment, the threaded rod 102 is located below the slot 118. That is, the threaded rod 102 is vertically below the slot 118. The threaded rod is shown in FIG. 2 centered under the slot 118. Consequently, trash or debris falling through the slot 118 will likely contact the threaded rod. FIG. 1, alternately, shows a threaded rod 102 or rods positioned laterally removed from below the slot 118, that is, not directly under the slot. Consequently, trash falling through the slot 118 is unlikely to contact the rod 102.

FIGS. 3-7 show a preferred embodiment of the present invention. FIG. 3 is a side, cross-sectional view of the truss table 101 and jigging assembly 100. The threaded rod 102 turns under the influence of a motor 114, seen in FIGS. 4 and 5, which is controlled by a motion control system. Rotation of the threaded rod 102 causes the puck assembly 108, including the puck carriage 110 and steel puck 109, to move along the slot 118 in the truss assembly table surface to a position which will define the perimeter of a truss once all the pucks of the system 100 are in position. The slot 118 is shown as a ½ inch (1.3 cm) wide slot. This narrow slot prevents larger debris and trash from falling through the slot 118.

The puck assembly 108, seen at FIG. 3, includes a puck 109 attached to a housing or carriage 110 by bolt 112. Between the carriage 110 and the threaded rod 102 is a threaded insert 113. The insert 113 defines a threaded passageway 103 which receives the threaded rod 102. The insert is preferably a Nylatron (trademark) GSM insert or any equivalent thereof. For maintenance purposes, this insert 103 should be made from a material that provides permanent self lubrication and long wear without the addition of dry or wet lubricants that can attract and trap dirt, dust, and debris. Nylatron (trademark) NSM is one such material. There are many others.

The carriage 110 is supported by a steel glide tube, or rod support member 116, which runs the full length of the slot 118 in the table 101. The rod support member 116 is shown as an approximately 1 inch (2.5 cm) wide tubular steel member. The support member 116 is shown centered below the slot 118 and is shown as wider than the slot. The support member 116 contacts the carriage 110, thereby supporting the threaded rod 102 and preventing excessive sagging of the rod. The support rod 116 is narrower than the carriage 110. This creates overhangs on either side of the carriage 110.

The support member 116 may include a glide pad 120. Between the carriage 110 and the rod support member 116, is a Nylatron (trademark) NSM glide pad 120. This pad 120 provides a low friction, self lubricating, highly wear-resistant support surface for the carriage 110. The support member 116 provides a guide surface on which the carriage 110 and support blocks A1, A2, B1 and B2 ride.

It should be obvious that the combination of the steel puck mounted to the steel carriage with a steel bolt will provide a durable assembly that will resist extreme abuse from the truss assembly activity that occurs on the surface of the table. This abuse comes primarily from lumber that is being tossed onto the surface of the table and moved into position for truss assembly. Workers will also kick the pucks or hit them with hammers on occasion. This assembly will not be damaged by such activities.

Quick set up of all puck assemblies 108 is achieved by turning the threaded rod 102 at high revolutions per minute. The motion control motor 114 in the assembly 100 are directly coupled to the rods 102 and are of sufficient power to turn the rod 102 without gear reduction. Thus, the maximum revolutions per minute of the motor can be imparted directly to the threaded rod. The motor 114 is shown as mounted in-line, via motor mount 117, with the threaded rod 102.

For truss jigging, the rods 102 that drive the pucks 108 must be about 12 to 14 feet (3.66 to 4.27 meters) long. At this length, the rod 102 will sag under its own weight and, when turned at high revolutions per minute, will whip and gyrate violently unless it is properly constrained. Proper constraint is the key to achieving the desired objective of smooth operation of the threaded rod. The assembly 100 shown will provide that support without creating places for dirt and debris to collect.

Figure 4:
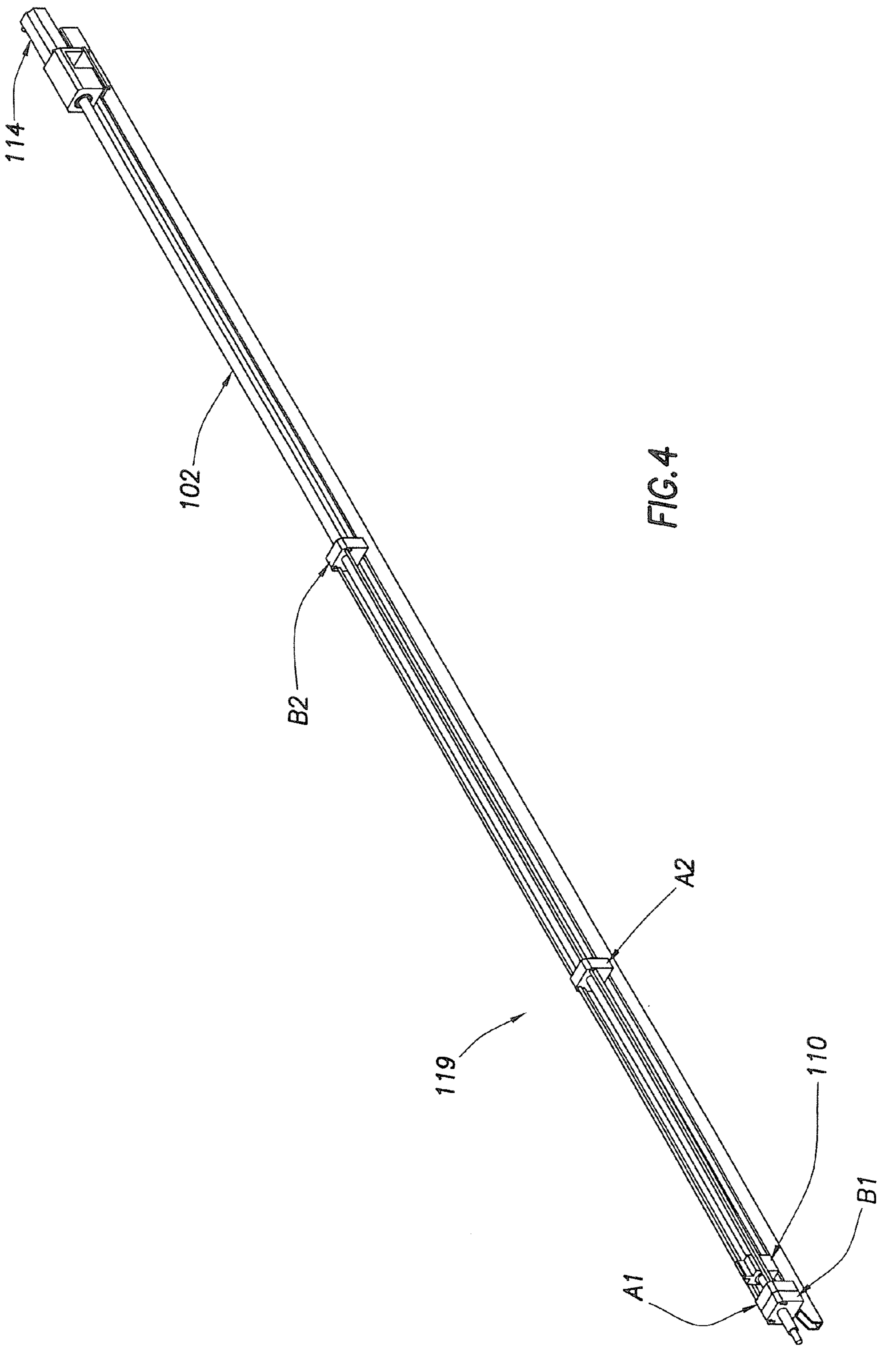
FIG. 4 is an orthogonal view of the puck carriage and support block assembly according to one embodiment of the invention.
Figure 5:
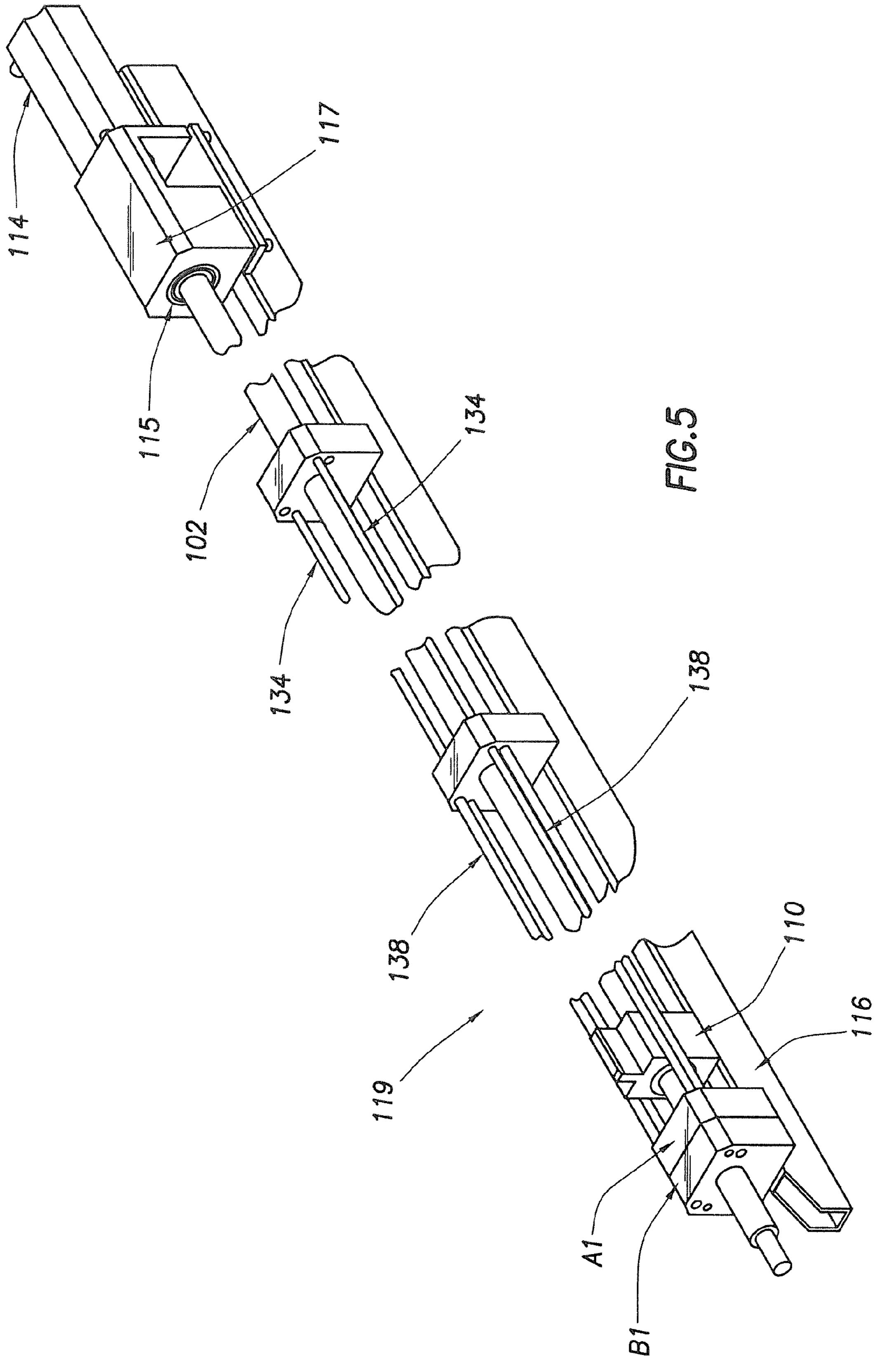
FIG. 5 is a partial detail of the carriage and support assembly of FIG. 4.

FIG. 4 is an orthogonal view of the carriage 110 and support block assembly 119 including support glide blocks A1, A2, B1 and B2. FIG. 5 is a partial detail of the carriage 110 and support assembly 119 of FIG. 4.

The jigging assembly 100 also includes glide or support blocks A1, A2, B1 and B2. FIG. 6 is a side and front view of glide support block A2. Support block A2 has a through hole or passageway 130 for receiving rod 102. Support block A2 also has through holes or passageways 132 for connecting rods 134. Support block A2 has attaching holes 136 for receiving connecting rods 138. Connecting rods 134 and 138 are connected to their respective glide support blocks by set screws 140. Connecting rods 134 and 138 are not located below the slot 118, but rather spaced laterally to the side of the slot 118.

As shown in FIGS. 4 and 5, when the steel carriage 110 is located at the opposite end of the rod 102 from the motor 114, the glide blocks A1, A2, B1 and B2 will be positioned as shown. In this position, the distance between glide blocks A2 and B2 is such that they support the threaded rod 102 at approximately one-third intervals along its length. As the carriage 110 moves toward the motor 114, the carriage 110 travels freely between support blocks A1 and A2 and is supported by the steel support member 116. When the carriage 110 strikes support block A2, it begins to drag support block A1 along because block A2 is connected to block A1 by one pair of steel connecting rods 138.

As best seen in FIG. 3, all of the glide support blocks are constrained by the steel support tube 116 from below, the steel side walls 124 or channels on both sides, and the under side 107 of the steel table top 105 from above. These constraints mean that the support blocks provide support to the entire 360 degree circumference of the threaded rod. Experimentation has determined that this support at one-third points is sufficient to prevent gyration of the rod for this particular application. Other support intervals may be needed for rods with different length, diameter, and revolutions per minute configurations.

As the carriage 110 continues its movement, support block A1 moves away from support block B1, and the intervals of support are maintained along the length of the rod. When block A2 strikes block B2, block B1 begins to move because it is attached to B2 through the other pair of steel connecting rods 134. This other pair of connecting rods 134 passes through both blocks A1 and A2 without being connected to them. FIG. 6 is an elevation view of the support block A2 showing through holes 132 for connecting rods 134. Connecting rods 138 are attached to blocks A2 and A1. Similarly, blocks B1 and B2 are attached to connecting rods 134 while having through holes for connecting rods 138.

As the movement of the carriage 110 continues, support blocks A2 and B2 are eventually moved together and both pushed by the carriage 110. Support blocks A1 and B1 are then dragged along because of their connection through the two pair of steel connecting rods to blocks A2 and B2, respectively. But support blocks A1 and B1 are now spaced apart because of the different lengths of the connecting rods 134 and 138. When the carriage 110 arrives at the motor end of the rod 102, support blocks A1 and B1 will be positioned at approximate one-third points along the length of the rod. Throughout the movement process, the rod 102 is supported at spaced intervals by the glide support blocks as well as the threaded rod insert 113 in the carriage 110.

Thus, the threaded rod 102 has been properly constrained to prevent gyration, whipping and excessive vibration. The primary benefit of this smooth motion is the reduction of wear and tear on the bearings 115 and motor 114 in the motion system. This will improve the service life of these components. It will also reduce the power required to operate the system.

A secondary benefit is the reduction of noise produced by the system during operation. Poorly constrained systems are extremely noisy. The noise level produced by these systems when several pucks are being positioned at the same time is high enough that hearing protection should be utilized. With the system of the current invention, such measures are not necessary.

Figure 7:
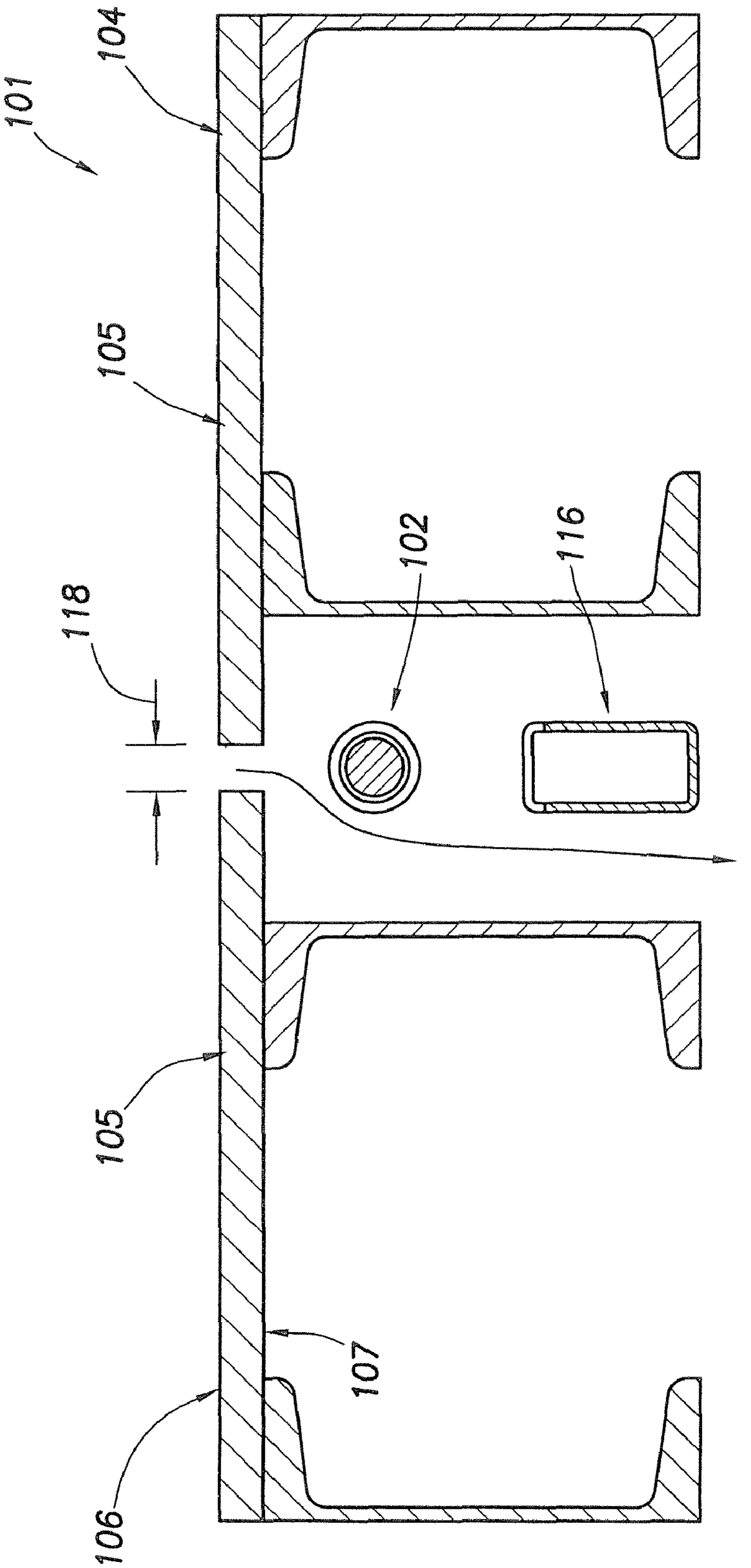
FIG. 7 is a cross section, side view of the table and support system in accordance with one embodiment of the invention with the certain parts removed.

FIG. 7 is a cross section of the table and rod assembly where the support glide blocks, steel carriage, and certain parts on each end of the system have been removed for clarity. The first step in contamination reduction is the utilization of a ½ inch (1.3 cm) slot in the table surface. This slot is narrow enough to prevent all large debris from entering the zone of the puck movement mechanism. Secondly, dirt and debris small enough to enter the narrow slot will easily fall through the open areas around the threaded rod 102 and support tube 116 and all the way to the floor. Debris path 126 to the floor is seen in FIG. 7 with a path defined on both sides of the support member 116. Stated another way, on both sides of the support member 116 are longitudinally extending open areas. The open areas extend longitudinally along the length of support member 116. The longitudinal spaces or open areas allow debris to fall on either side of the support member 116.

Finally, it is very important that all the areas of friction in the system are made from self-lubricating materials, so that no wet or dry lubricants are required for proper maintenance. This will insure that dirt and debris never adhere to any of the working surfaces. An added benefit will be the elimination of lubrication maintenance activities. In addition to the use of Nylatrion (trademark) NSM for the threaded insert and glide pad 120 on the steel carriage, the glide blocks (A1, A2, B1, and B2) are also made of Nylatron (trademark) to provide this self-lubricating benefit throughout the entire system.

The system of the invention also may include controlling means for controlling the movement of the puck assemblies on the table, sensing the movement of the puck assemblies and monitoring the current positions of the puck assemblies at each set up. Software application programs are generally available from various sources (such as truss hardware vendors) for calculating the positions of the stops on a jig table as measured from a reference line, such as the edge of the table or other mark. Such programs output sets of coordinates that are used to measure from the reference edge of the table to the appropriate position of the pucks or stops for each slot.

Upon transfer of the puck assembly positional information to the system, the system actuates, or supplies power to, the respective motors to cause movement of the puck assemblies toward the desired positions in the truss jig set up. The position sensors detect and count the movement of the rods, and, when the associated position sensors detect that the number of position counts counted correspond to the final position of the puck assembly in the set up, the respective motors are de-actuated by ceasing the supply of power to the motors.

There has, thus, been outlined, rather broadly, the more-important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

Having described the invention, what is claimed is:

1. A jig positioning system for use on a truss assembly table, the system comprising:

a table having a plurality of jig assembly slots extending laterally across a table top, the jig assembly slots extending substantially across the width of the table;

a puck assembly having a puck positioned at least partially above the table top, the puck connected to a carriage positioned at least partially below the table top, the puck and carriage connected to one another by a portion of the puck assembly which extends through a slot in the table top;

a threaded rod extending through a mating passageway in the carriage, the threaded rod thereby operable to move the carriage and connected puck assembly along the slot when the threaded rod is rotated, the threaded rod extending substantially across the width of the table;

a stationary rod support member extending parallel to and along at least the substantial length of the threaded rod and the slot, and positioned below the threaded rod, the support member contacting the carriage as the carriage moves in relation to the rod support member, thereby supporting the threaded rod; and open areas extending longitudinally along each side of the support member, the open areas allowing debris to fall to the floor on either side of the support member.

2. A system as in claim 1 wherein the threaded rod is positioned directly below the slot.

3. A system as in claim 1 wherein the support member is narrower than the carriage.

4. A system as in claim 3 wherein the slot in the table is narrower than the support member and narrower than the carriage.

5. A system as in claim 1 wherein the slot in the table is narrower than the support member and narrower than the carriage.

6. A system as in claim 1 further comprising a support block assembly for supporting the threaded rod at spaced intervals along its length, the support block assembly having a pair of support blocks positioned below the table top, each block having a passageway defined therethrough, the threaded rod extending through the passageway of each support block, each support block thereby supporting the threaded rod, and wherein movement of the carriage along the slot causes movement of the support blocks.

7. A system as in claim 6 wherein the pair of support blocks are connected to one another such that the support blocks move in unison.

8. A system as in claim 7 wherein the pair of support blocks are connected to one another by at least two connecting rods, the at least two connecting rods spaced laterally from the slot such that they are not directly below the slot.

9. A system as in claim 6 wherein the support block assembly has a second pair of support blocks, the second pair of support blocks connected to one another such that the second pair of support blocks move in unison, each of the second pair of support blocks having a passageway defined therethrough, the threaded rod extending through the passageways, each of the second pair of support blocks thereby supporting the threaded rod, and wherein movement of the carriage along the slot causes simultaneous movement of the support blocks.

10. A system as in claim 9 wherein the support blocks provide support to the threaded rod at distances apart approximately equal to one-third the length of the threaded rod.

11. A system as in claim 6 wherein the support member further comprises a glide pad, the glide pad contacting the support blocks.

12. A system as in claim 1 wherein the support member further comprises a glide pad, the glide pad contacting the threaded rod.

13. A system as in claim 12 wherein the glide pad is made of Nylatron.

14. A system as in claim 1 wherein the support member is a steel tubular.

15. A jig positioning system for use on a truss assembly table, the system comprising:

a table having a plurality of jig assembly slots extending laterally across a table top;

a puck assembly having a puck positioned at least partially above the table top, the puck connected to a carriage positioned at least partially below the table top, the puck and carriage connected to one another by a portion of the puck assembly which extends through a slot in the table top;

a threaded rod extending through a mating passageway in the carriage, the threaded rod thereby operable to move the puck assembly and connected carriage along the slot when the threaded rod is rotated;

a support block assembly for supporting the threaded rod at spaced intervals along its length, the support block assembly having a plurality of support blocks positioned below the table top, each support block having a passageway defined therethrough, the threaded rod extending through the passageway of each support block, each support block thereby supporting the threaded rod, and wherein movement of the carriage along the slot causes movement of the support blocks; and a rod support member extending parallel to the threaded rod and positioned below the threaded rod, the support member contacting the carriage and support blocks, thereby supporting the threaded rod.

16. A system as in claim 15 further comprising open areas extending longitudinally along each side of the support member, the open areas allowing debris to fall to the floor on either side of the support member.

17. A system as in claim 15 wherein the threaded rod positioned directly below the slot.

18. A system as in claim 17 wherein the support member is narrower than the carriage.

19. A system as in claim 15 further comprising side walls extending longitudinally along and spaced apart from the support member and threaded rod, the side walls constraining rotational movement of the support blocks.

* * * * *